(12) United States Patent
Ganteaume

(10) Patent No.: US 11,645,118 B2
(45) Date of Patent: May 9, 2023

(54) CONFIGURABLE TOOL FOR FACILITATING A PLURALITY OF CLOUD SERVICES

(71) Applicant: CACI International Inc., Arlington, VA (US)

(72) Inventor: Oscar E. Ganteaume, Falls Church, VA (US)

(73) Assignee: CACI INTERNATIONAL, INC., Arlington, VA (US)

(*) Notice: Subject to any disclaimer, the term of this patent is extended or adjusted under 35 U.S.C. 154(b) by 158 days.

(21) Appl. No.: 16/430,700

(22) Filed: Jun. 4, 2019

(65) Prior Publication Data

US 2019/0340190 A1    Nov. 7, 2019

Related U.S. Application Data

(63) Continuation-in-part of application No. 15/969,839, filed on May 3, 2018, now Pat. No. 11,256,548.

(51) Int. Cl.

| | | |
|---|---|---|
| *G06F 16/33* | (2019.01) | |
| *G06F 9/50* | (2006.01) | |

(Continued)

(52) U.S. Cl.
CPC ........ *G06F 9/5038* (2013.01); *G06F 16/3344* (2019.01); *G06F 40/30* (2020.01); *G10L 15/22* (2013.01); *G10L 15/26* (2013.01); *G10L 15/34* (2013.01); *H04L 43/16* (2013.01); *H04L 67/10* (2013.01); *G06F 8/60* (2013.01);

(Continued)

(58) Field of Classification Search
CPC .... G06F 9/5038; G06F 9/5072; G06F 40/205; G06F 40/30; G06N 3/0454; G06N 3/082
See application file for complete search history.

(56) References Cited

U.S. PATENT DOCUMENTS

| | | | |
|---|---|---|---|
| 4,969,092 A | 11/1990 | Shorter | |
| 6,430,602 B1 * | 8/2002 | Kay | ........................ H04L 51/04 |
| | | | 709/206 |

(Continued)

FOREIGN PATENT DOCUMENTS

WO    2017/161329 A1    9/2017

OTHER PUBLICATIONS

Sridhar et al. "Evaluating Voice Interaction Pipelines at the Edge". Jun. 25, 2017. pp. 248-251. (Year: 2017).*

(Continued)

*Primary Examiner* — Jae U Jeon
(74) *Attorney, Agent, or Firm* — BakerHostetler; Tayan B. Patel

(57) ABSTRACT

The present disclosure pertains to a system configured to generate output data from a series of configurable cloud-computing processing operations. Some embodiments may; obtain, from a first database, data in a first format; process, in a first stage, the obtained data such that the obtained data is normalized; process, in a second stage, data in a second format different from the first format using a first set of cloud-computing devices; and detect, via a user interface, a first selection of at least two processing operations, the first selection being made from among a plurality of available processing operations. Each of the processing stages may include input data, a processing operation, and output data.

19 Claims, 8 Drawing Sheets

(51) Int. Cl.
  *H04L 67/10*      (2022.01)
  *G10L 15/22*      (2006.01)
  *G06F 40/30*      (2020.01)
  *G10L 15/26*      (2006.01)
  *G10L 15/34*      (2013.01)
  *H04L 43/16*      (2022.01)
  *G10L 15/08*      (2006.01)
  *H04L 41/0869*    (2022.01)
  *H04L 41/0806*    (2022.01)
  *G06F 8/60*       (2018.01)
  *H04L 67/141*     (2022.01)
  *G06F 8/61*       (2018.01)
  *H04L 41/0803*    (2022.01)
  *G06F 9/54*       (2006.01)
  *H04L 67/12*      (2022.01)
  *G06Q 10/06*      (2023.01)
  *G06Q 30/00*      (2023.01)
  *G06F 9/455*      (2018.01)
  *G06Q 10/0631*    (2023.01)

(52) U.S. Cl.
  CPC ........... *G06F 8/63* (2013.01); *G06F 9/5072* (2013.01); *G06F 9/5077* (2013.01); *G06F 9/541* (2013.01); *G06F 2009/4557* (2013.01); *G06F 2009/45562* (2013.01); *G06F 2209/503* (2013.01); *G06Q 10/06* (2013.01); *G06Q 10/0631* (2013.01); *G06Q 30/00* (2013.01); *G10L 2015/088* (2013.01); *G10L 2015/223* (2013.01); *H04L 41/0803* (2013.01); *H04L 41/0806* (2013.01); *H04L 41/0869* (2013.01); *H04L 67/12* (2013.01); *H04L 67/141* (2013.01)

(56) References Cited

U.S. PATENT DOCUMENTS

| | | | |
|---|---|---|---|
| D470,858 S | 2/2003 | Flamini | |
| D552,617 S | 10/2007 | Noviello et al. | |
| D553,139 S | 10/2007 | Noviello et al. | |
| D553,140 S | 10/2007 | Noviello et al. | |
| D553,141 S | 10/2007 | Noviello et al. | |
| D554,653 S | 11/2007 | Noviello et al. | |
| D558,213 S | 12/2007 | Noviello et al. | |
| D566,124 S | 4/2008 | Soderstrom | |
| D594,464 S | 6/2009 | Ng et al. | |
| 7,613,610 B1 * | 11/2009 | Zimmerman | G16H 10/60 707/999.005 |
| D607,463 S | 1/2010 | Krieter et al. | |
| D665,413 S | 8/2012 | Rai et al. | |
| D681,651 S | 5/2013 | Fletcher et al. | |
| D688,262 S | 8/2013 | Pearcy et al. | |
| D689,892 S | 9/2013 | Perry et al. | |
| D690,309 S | 9/2013 | Wenz et al. | |
| D694,252 S | 11/2013 | Helm | |
| D694,259 S | 11/2013 | Klein | |
| 8,631,458 B1 | 1/2014 | Banerjee | |
| D705,245 S | 5/2014 | Coffman et al. | |
| 8,775,165 B1 * | 7/2014 | Oikawa | G06F 40/40 704/10 |
| 8,978,034 B1 * | 3/2015 | Goodson | G06F 16/21 718/101 |
| D741,876 S | 10/2015 | Gaskins et al. | |
| D748,664 S | 2/2016 | Noack et al. | |
| D752,616 S | 3/2016 | Kouvas et al. | |
| D752,617 S | 3/2016 | Kouvas et al. | |
| D753,684 S | 4/2016 | Rahn et al. | |
| D757,071 S | 5/2016 | Kouvas et al. | |
| D764,512 S | 8/2016 | Mcneil et al. | |
| D771,087 S | 11/2016 | Lee et al. | |
| D774,058 S | 12/2016 | Dias et al. | |
| D779,531 S | 2/2017 | List et al. | |
| D780,199 S | 2/2017 | Croan | |
| D781,300 S | 3/2017 | Rhodes et al. | |
| D781,301 S | 3/2017 | Rhodes et al. | |
| D788,128 S | 5/2017 | Wada | |
| D790,573 S | 6/2017 | Kim et al. | |
| 9,712,510 B2 | 7/2017 | Vinnik et al. | |
| 9,715,400 B1 | 7/2017 | Sethuramalingam et al. | |
| D797,115 S | 9/2017 | Guinness et al. | |
| 9,781,205 B2 | 10/2017 | Batrouni et al. | |
| 9,841,988 B1 | 12/2017 | Magnezi et al. | |
| D807,900 S | 1/2018 | Raji et al. | |
| 9,860,569 B1 | 1/2018 | Wilms et al. | |
| 10,108,605 B1 * | 10/2018 | Leighton | G06F 40/205 |
| 10,110,600 B1 | 10/2018 | Simca | |
| D836,120 S | 12/2018 | Dudey | |
| 10,148,493 B1 | 12/2018 | Ennis et al. | |
| D842,313 S | 3/2019 | Kagan et al. | |
| D851,109 S | 6/2019 | Gualtieri | |
| D851,669 S | 6/2019 | Baldi et al. | |
| 10,346,188 B1 | 7/2019 | Christensen et al. | |
| 10,412,022 B1 | 9/2019 | Tang et al. | |
| 10,454,795 B1 | 10/2019 | Jonsson et al. | |
| D869,491 S | 12/2019 | Bachman et al. | |
| D872,121 S | 1/2020 | Einspahr et al. | |
| 10,545,951 B1 | 1/2020 | Lieberman | |
| 10,649,630 B1 | 5/2020 | Vora et al. | |
| 10,685,669 B1 * | 6/2020 | Lan | G10L 15/1822 |
| D916,110 S | 4/2021 | Wiese et al. | |
| D916,847 S | 4/2021 | Slater et al. | |
| D932,508 S | 10/2021 | Regev et al. | |
| D933,675 S | 10/2021 | Doyle et al. | |
| D937,867 S | 12/2021 | Becker et al. | |
| D938,465 S | 12/2021 | Shen et al. | |
| 2005/0120160 A1 | 6/2005 | Plouffe et al. | |
| 2009/0024940 A1 | 1/2009 | Zeringue et al. | |
| 2011/0078303 A1 | 3/2011 | Li et al. | |
| 2011/0238458 A1 | 9/2011 | Purcell et al. | |
| 2012/0005341 A1 | 1/2012 | Seago et al. | |
| 2012/0089914 A1 | 4/2012 | Holt et al. | |
| 2012/0131591 A1 | 5/2012 | Moorthi et al. | |
| 2012/0214602 A1 * | 8/2012 | Ahlstrom | G06Q 10/06 463/43 |
| 2012/0240110 A1 | 9/2012 | Breitgand et al. | |
| 2013/0007753 A1 | 1/2013 | Jain | |
| 2013/0111487 A1 * | 5/2013 | Cheyer | G06N 5/041 718/102 |
| 2013/0211870 A1 | 8/2013 | Lawson et al. | |
| 2013/0212129 A1 | 8/2013 | Lawson et al. | |
| 2013/0212507 A1 | 8/2013 | Fedoseyeva et al. | |
| 2013/0238772 A1 | 9/2013 | Armour et al. | |
| 2013/0238805 A1 | 9/2013 | Catrein et al. | |
| 2013/0283263 A1 | 10/2013 | Elemary | |
| 2013/0290694 A1 | 10/2013 | Civilini et al. | |
| 2013/0318527 A1 | 11/2013 | Tamura | |
| 2014/0079207 A1 | 3/2014 | Zhakov et al. | |
| 2014/0137073 A1 | 5/2014 | Dees et al. | |
| 2014/0171017 A1 | 6/2014 | Menezes et al. | |
| 2014/0379428 A1 * | 12/2014 | Phansalkar | H04L 67/535 705/7.32 |
| 2015/0058486 A1 | 2/2015 | Huang et al. | |
| 2015/0134424 A1 | 5/2015 | Matzlavi et al. | |
| 2015/0150023 A1 * | 5/2015 | Johnson | G06F 9/5072 718/107 |
| 2015/0163285 A1 | 6/2015 | Chakra et al. | |
| 2015/0261514 A1 | 9/2015 | Fu et al. | |
| 2015/0295731 A1 | 10/2015 | Bagepalli et al. | |
| 2015/0304231 A1 | 10/2015 | Gupte et al. | |
| 2015/0309769 A1 | 10/2015 | Greene et al. | |
| 2015/0341445 A1 | 11/2015 | Nikolov et al. | |
| 2015/0341469 A1 | 11/2015 | Lawson et al. | |
| 2015/0378769 A1 | 12/2015 | Buck et al. | |
| 2015/0381711 A1 | 12/2015 | Singh et al. | |
| 2016/0018962 A1 | 1/2016 | Low et al. | |
| 2016/0094483 A1 | 3/2016 | Johnston et al. | |
| 2016/0098298 A1 | 4/2016 | Trefler et al. | |
| 2016/0134932 A1 | 5/2016 | Karp et al. | |
| 2016/0154665 A1 | 6/2016 | Iikura et al. | |
| 2016/0335244 A1 * | 11/2016 | Weisman | G06F 40/284 |
| 2016/0359740 A1 * | 12/2016 | Parandehgheibi | G06F 16/248 |

(56) References Cited

U.S. PATENT DOCUMENTS

| | | |
|---|---|---|
| 2016/0378450 A1 | 12/2016 | Fu et al. |
| 2017/0024260 A1 | 1/2017 | Chandrasekaran et al. |
| 2017/0097841 A1 | 4/2017 | Chang et al. |
| 2017/0104755 A1 | 4/2017 | Arregoces et al. |
| 2017/0339070 A1 | 11/2017 | Chang et al. |
| 2017/0366373 A1 | 12/2017 | Bagepalli et al. |
| 2018/0004553 A1 | 1/2018 | Wagner et al. |
| 2018/0032203 A1 | 2/2018 | Sepulveda et al. |
| 2018/0165122 A1 | 6/2018 | Dobrev |
| 2018/0183578 A1 | 6/2018 | Chakrabarti et al. |
| 2018/0219740 A1 | 8/2018 | Kamath et al. |
| 2018/0225103 A1 | 8/2018 | Krishnan et al. |
| 2018/0225266 A1 | 8/2018 | White et al. |
| 2018/0232662 A1* | 8/2018 | Solomon ............ G06K 9/00214 |
| 2018/0284975 A1* | 10/2018 | Carrier ................ G06F 16/9535 |
| 2018/0295033 A1 | 10/2018 | Vladimirskiy et al. |
| 2018/0302340 A1 | 10/2018 | Alvarez et al. |
| 2018/0316552 A1 | 11/2018 | Subramani et al. |
| 2018/0316751 A1 | 11/2018 | Shen et al. |
| 2018/0336285 A1 | 11/2018 | Amdur et al. |
| 2018/0336903 A1* | 11/2018 | Durham ................. G10L 25/27 |
| 2018/0341839 A1* | 11/2018 | Malak ................... G06K 9/4628 |
| 2018/0341927 A1 | 11/2018 | Agarwal et al. |
| 2018/0359162 A1 | 12/2018 | Savov et al. |
| 2018/0367434 A1 | 12/2018 | Kushmerick et al. |
| 2019/0043486 A1* | 2/2019 | Salloum .................. G10L 15/16 |
| 2019/0079751 A1 | 3/2019 | Foskett et al. |
| 2019/0102098 A1 | 4/2019 | Biswas et al. |
| 2019/0102719 A1 | 4/2019 | Singh et al. |
| 2019/0104032 A1 | 4/2019 | Du et al. |
| 2019/0130286 A1* | 5/2019 | Salameh .................. G06F 9/54 |
| 2019/0132211 A1 | 5/2019 | Yeung et al. |
| 2019/0179725 A1 | 6/2019 | Mital et al. |
| 2019/0188035 A1 | 6/2019 | Nicholson et al. |
| 2019/0197105 A1* | 6/2019 | Tagra ..................... G06F 40/30 |
| 2019/0215248 A1 | 7/2019 | D'Ippolito et al. |
| 2019/0220315 A1 | 7/2019 | Vallala et al. |
| 2019/0222988 A1 | 7/2019 | Maes et al. |
| 2019/0303018 A1 | 10/2019 | Huang et al. |
| 2020/0186435 A1 | 6/2020 | Hardy et al. |
| 2020/0265384 A1 | 8/2020 | Bleazard |
| 2021/0011743 A1 | 1/2021 | Canada et al. |
| 2021/0035069 A1 | 2/2021 | Parikh |
| 2021/0304269 A1 | 9/2021 | Norwood et al. |

OTHER PUBLICATIONS

Khumoyun et al. "Storm based Real-time Analytics Service on Propaganda and Sentiment Analysis of Political Tweets on Cloud Computing Environment". Jan. 21, 2016. pp. 61-65. (Year: 2016).*

Rea, Susan, et al. "Building a Robust, Scalable and Standards-Driven Infrastructure for Secondary Use of EHR Data: The SHARPn Project". 2012. Journal of biomedical informatics, 45(4), pp. 763-771. (Year: 2012).*

Rea ("Building a Robust, Scalable and Standards-Driven Infrastructure for Secondary Use of EHR Data: The SHARPn Project") Aug. (Year: 2012).*

Srirama, S. N. et al. Jun. 27, 2016. Dynamic deployment and auto-scaling enterprise applications on the heterogeneous cloud. In 2016 IEEE 9th International Conference on Cloud Computing (CLOUD) (pp. 927-932). IEEE. (Year: 2016).

"Overview | Google Cloud." Cloud.Google.Com, published Aug. 27, 2018 (Retrieved from the Internet Feb. 15, 2022). Internet URL: <https://web.archive.org/web/20180827103110/https://cloud.google.com/docs/overview/> (Year: 2018).

Ghosh, Abhishek. "Run Kubernestes Locally with Minikube." The Customize Windows, updated Apr. 25, 2018 (Retrieved from the Internet Feb. 15, 2022). Internet URL: <https://thecustomizewindows.com/2017/12/run-kubernetes-locally-minikube-macos-x-ubuntu/> (Year: 2018).

Sharma, Vaibhav. "Skylus Home Screen-Cloud Computing Dashboard." Dribbble, published Jun. 20, 2020 (Retrieved from the Internet Feb. 15, 2022). Internet URL: <https://dribbble.com/shots/12153824-Skylus-Home-Screen-Cloud-Computing-Dashboard> (Year: 2020).

* cited by examiner

Data Processing Thread Creation

Name: Techy-audio
Source: http://www.data.com/podcasts/techy
Type: ⦿ Audio ◯ Text ◯ Video
Schedule: ☑ Weekdays
Start: 03:00:00 PM
End: 09:00:00 PM Processing Operations:
- ☑ Speech to Text
- ☑ Translation
- ☑ Natural Language Processing Destination:
- ☑ MySQL Database
- ☑ ActiveMQ Message

[Save] [Reset]

FIG. 3A

NLP Parameters

Service:
- ⦿ Google NLP Service A
- ◯ AWS NLP Service B
- ◯ Azure NLP Service C

Parameters:
- ☑ Search Meaning
- ☑ Search Intent
- ☑ Search Sentiment

☑ Set as Default

[Save] [Cancel]

FIG. 3B

CONFIGURABLE TOOL FOR FACILITATING A PLURALITY OF CLOUD SERVICES

CROSS REFERENCE TO RELATED APPLICATIONS

This application is a continuation-in-part of application Ser. No. 15/969,839, filed May 3, 2018.

TECHNICAL FIELD

The present disclosure relates generally to systems and methods for configuring processing operations and more specifically to a user configuration of a pipeline for performing a series of cloud-computing services.

BACKGROUND

Current use of text processing technology heavily relies upon manual, human intervention, which is slow, expensive, and prone to error. Until recently, necessary human involvement was not a major issue, as text datasets were still limited in size. But the Internet has ushered in an era of Big Data where datasets on the scale of petabytes are common. Online text and audio-based data sources are both openly available for mining and continuously growing in size. Therefore, a critical need exists for services that are faster, cheaper, and more reliable at processing massive datasets.

Cloud-computing provides independent services. Cloud-computing comprises a multi-tenant model, with different physical and virtual resources dynamically assigned and reassigned according to consumer demand. A user may demand more than one service, though, for a particular application. Implementation of such need would require steep learning curves, i.e., for each service. But the problem grows in scope when considering integration of services. The complexity required to efficiently utilize cloud services can inhibit some users and companies from taking advantage of many benefits that cloud services provide. Learning the complexity and investing in utilizing a particular cloud service solution also locks in users to a particular environment, decreasing flexibility and competition.

Systems and methods are disclosed for flexibly configuring a series of processing operations, especially cloud-computing services. Accordingly, one or more aspects of the present disclosure relate to a method for configuring a plurality of processing stages, comprising: obtaining, from a first database, data in a first format; processing, in a first stage, the obtained data such that the obtained data is normalized; processing, in a second stage, data in a second format different from the first format using a first set of cloud-computing devices; and detecting, via a user interface, a first selection of at least two processing operations, the first selection being made from among a plurality of available processing, operations, wherein each of the processing stages comprises input data, a processing operation, and output data. The method is implemented by one or more hardware processors configured by machine-readable instructions and/or other components.

Yet another aspect of the present disclosure relates to a system configured for configuring a plurality of processing stages. The system comprises one or more processors and other components or media, e.g., upon which machine-readable instructions may be executed to perform the above-described method. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

FIG. 3A illustrates a UI for configuring processing operations, in accordance with one or more embodiments.

FIG. 3B illustrates an exemplary UI window for configuring service/processing vendors and/or parameters for one of the processing operations, in accordance with one or more embodiments.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Figure 1:
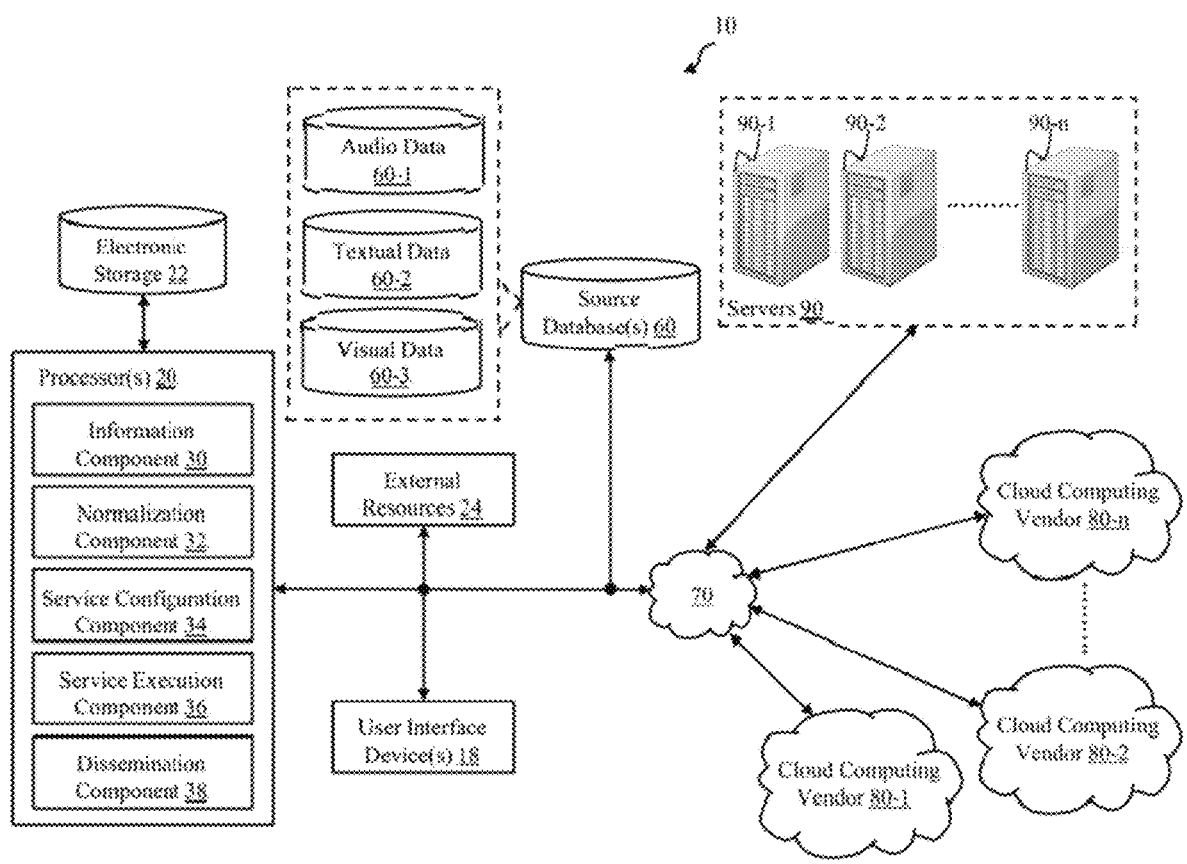
FIG. 1 schematically illustrates a system configured for facilitating a pipeline of cloud-computing services, accordance with one or more embodiments.

FIG. 1 illustrates system 10 configured to obtain different types of data and to process the data to satisfy a variety of different user demands. The user may configure, via a user interface (UI), processors 20 to coordinate with different cloud-computing vendors 80 such that servers 90 perform a series of processing operations. Each of these processing operations and an ordering of the operations may be configured in ad hoc fashion. The present disclosure thus relates to improved ways of automating tasks (e.g., those not reasonably capable by a human) of demand and at scale, e.g., via a continual series or pipeline.

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, a high performance computer (HPC), a vehicle computer, a game or entertainment system, a set-top-box, or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may physically located within the same device (e.g., server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, normalization component 32, configuration component 34, service execution component 36, dissemination component 38, and/or other components. Processor 20 may be configured to execute components 30, 32, 36, and/or 38 by; software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more components 30, 32, 34, 36, and/or 38 may be located remotely from the other components. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and or other information that enables system 10 to function as described herein.

External resources 24 may include sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by resources included in system 10. External resources 24 may be configured to communicate with processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface (UI) device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. Ins some embodiments, user interface devices 18 are connected to a network (e.g., the Internet). In some embodiments, user interface devices 18 do not include processor 20 electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP)) defines addressing methods and structures for datagram encapsulation. Of course other protocols also may be used. Examples of an Internet protocol include Internet Protocol Version 4 (IPv4) and Internet Protocol Version 6 (IPv6).

As discussed above, cloud services provide massive resources to all types of users, but often require specialized knowledge to leverage. Accordingly, aspects herein facilitate the use of cloud services by mitigating its inherent complexity in an unconventional manner. Aspects disclosed herein allow users to create, modify, remove, and launch processing operations (e.g., of a pipeline) without having to know how they are executed in the cloud, and in a manner which allows interoperability between cloud service providers and/or their own servers. This diverges from conventional techniques which requires detailed configuration for each type of cloud service based on the manner in which each type of cloud service initializes resources and handles tasks.

While utilization of a cloud service is known, routine techniques typically involve use of a single cloud service. After implementing service accomplishment in one set of cloud-computing devices (e.g., which may be offered by cloud-computing vendor 80-1), it would be difficult for many users to then understand how to integrate the results with other processing operations or to instead have a same result using a different vendor (e.g., 80-2), which may use a different set of cloud-computing devices. Some embodiments of configuration component 34 may thus consolidate and/or generalize configuration parameters for use in a plurality of different, available cloud services. The disclosed approach obviates the need to create and implement custom virtual machine (VM) controllers for each different application by each different set of users. As such, the present disclosure contemplates combining multiple, disparate cloud services. For example, some embodiments of configuration component 34 may leverage different cloud service libraries and/or tools, e.g., of different vendors 80. Some embodiments may provide tasks (or information for running tasks) to gateway endpoints of vendors 80 preconfigured to run the tasks using particular server resources 90 from among those available for that vendor.

As used herein, a cloud service or processing operation may be any task, service, function, or application that consumes resources in a cloud environment. The disclosed approach provides capability for software as a service (SaaS), platform as a service (PaaS), infrastructure-as-a-service (IaaS), database as a service (DBaaS), etc.

Some embodiments of service execution component 36 may cause vendors 80 to utilize virtualization to variously allocate or partition processing power (e.g., compute resources), storage, and networking services or resources according to the needs or desires of a user. Cloud services discussed herein include dedicated cloud solutions and shared cloud solutions. References to disparate or different cloud services (or similar type of language) indicate two or more cloud services of different types. This could include arrangements with at least one dedicated cloud solution and at least one shared cloud solution; two dedicated cloud solutions of different implementation (e.g., different operating systems or architectures); two shared cloud, solutions of different implementation (e.g., two or more of Microsoft Azure, Google Cloud, Amazon Web Services (AWS), Alibaba Cloud, IBM cloud services, Oracle cloud services, Samsung cloud Services, CenturyLink Cloud, etc.); and others.

In some embodiments, source database 60 may comprise data (e.g., audio data 60-1, textual data 60-2, etc.) obtained from product reviews of one or more products (e.g., via Amazon.com), from one or more blogs, from one or more news sites, from a social media site, and/or from other online sources. For example, the source data may be procured from Reddit, Facebook, Twitter, CNN, etc., but these examples are not intended to be limiting.

Database 60 may further comprise visual data 60-3. Examples of this visual data may comprise video or images depicting text (which can be run through optical Character recognition (OCR)), sign-language, or another form of body-language. The OCR may be a service offered by cloud computing vendor 80. In some implementations, visual data may be input into a first processing stage of a pipeline configured by a user via configuration component 34. A cloud OCR service may then be caused to perform by execution component 36 such that accurate textual data is generated. In another example, the visual data may be interpreted by an artificial intelligence (AI) processing stage, such as one implementing a convolutional neural network (CNN) to identify symbols of the American Sign Language (ASL) to generate representative, textual data.

Each of vendors 80 may offer a set of cloud-computing services, including virtual processing and storage. Vendors 80, with consent or by direction of users of system 10, may coordinate use of servers 90, which may be connected to one another. For example, servers 90 may be installed in rows of racks. A rack refers to the physical housing or platform for any number of servers that perform data-processing, administrative, and/or storage functionality. Servers 90 pertaining to each cloud computing vendor 80 may be located in a room, building, datacenter, or another geographic location. Servers 90 may comprise general purpose computing hardware at least some of which are communicatively coupled (e.g., via known networking and/or bus protocols) to each other and to central computing equipment of vendors 80. Vendors 80 may deploy and/or allocate any number of VMs to computing devices of servers 90 in accordance with service requirements of users, as configured automatically by configuration component 34 of FIG. 1.

Some embodiments of servers 90 may have a plurality of different sets of computing devices, e.g., clustered into racks as nodes and into rows of racks in some cases. A set of many servers 90 may form one of a plurality of different datacenters useable by vendors 80. For example, servers 90-1 and 90-2 may be installed at datacenter 1 and Servers 90-*m* and 90-*n* may be installed in datacenter 2, datacenter 2 most likely being in a different location from datacenter 1. Servers 90 are not contemplated herein to be limited to any particular type or configuration of physical processing units (e.g., mobile device, desktop, workstation, set of processing cores, HPC, etc.); rather, any computer-hardware resource (e.g., RAM and/or other data storage, processor(s), inputs/outputs (IOs), etc.) for executing an on-demand service is contemplated as the physical structure for a cloud-computing service (or portion of a service) in this disclosure. None of the plurality of users of system 10, who make the demands, has active, direct management of the server that performs the service, that control being rather shared with vendor 80, such as Google, Amazon, IBM, etc.

Some embodiments of servers 90 may comprise one or more virtual machines (e.g., virtual servers). Similarly, any operating system is contemplated for use by servers 90. Many different users may share servers 90, whether a set of processors are shared or divided up between the users (e.g., at controlled times). Servers 90 used by a particular vendor may be co-located in a single location or installed across multiple locations. In some implementations, a first set of central servers 90 may distribute functions to a second set of compute servers 90 and/or a third set of storage servers 90. Each of servers 90 may therefore be administrative (e.g., for controlling, gathering, and/or analyzing status, etc.), for performing computation, or for storage. Vendors 80 may own, lease, or operate servers 90 via any arrangement. Users of servers 90, as distributed by vendors 80, may be a single organization (i.e., enterprise cloud), many organizations (i.e. public cloud), or a combination of both (i.e., hybrid cloud).

In some implementations, information component 30 may spawn web crawlers that browse specified (e.g., via a provided URL) sources of data including, e.g., reviews for products, blogs, streaming data, news sites, other websites, etc. Once the data is obtained, it may be translated (e.g., at stage 110 of FIG. 6) from an original language and processed in a natural language processing (NLP) stage (e.g., 114 of FIG. 6) to determine, e.g., whether positive or negative reviews were made. Service execution component 36, dissemination component 38, or a user of system 10 may then make an estimate as to why sales are declining in that particular region (e.g., where the original language is spoken) based on the data from NLP stage 114. In some implementations, information component 30 may spawn web crawlers that crawl online sources at specified (e.g., via a field of the UI, as exemplarily depicted in the upper-right corner of FIG. 3A) times. For example, once configured as such by component 34, information component 30 may crawl databases comprising a copy of the broadcast data (or may receive a streaming version of the broadcasts) from the Sunday TV talk shows data and perform processing from 12 PM to 5 PM. To perform this processing and/or the crawling, execution component 36 may cause five VMs for the five different shows to be assigned to the user. That is, in this example, at each hour starting at noon each Sunday, a new VM may be started. After the programs go off the air, execution component 36 may complete the processing operations and stop each of the VMs.

Information component 30 may be capable of obtaining data of any known form (e.g., spoken or other audio, written or other visual, haptic, etc.) such that system 10 is data-source agnostic. In some embodiments, an outcome of this processing may result in textual (e.g., American standard code for information interchange (ASCII), hexadecimal, or another binary standard) data.

In some embodiments, information component 30 obtains, e.g., via a local area network (LAN), the Internet, or another network, input data from database 60. This input data may be, e.g., developed by a first institution using at least a first software program. Subsequent processing of similar data, which is obtained from a second institution (different from the first institution) and which is developed using at least a second software program (different from the first software program), may be performed by the same set of processing stages. As such, in some embodiments, the subsequent processing may be performed independent of an originating file format. This feature of being able to support different types of data may be supported by normalizing operations, such as stages 104 and/or 108 of FIG. 6. In these or other embodiments, service configuration component 34 may automatically select one from among a plurality of cloud computing vendors 80 based on a format of the to-be-processed data such that the selected vendor performs the selected service via a set of servers 90.

In some embodiments, the source data obtained by information component 30 may be continuously and even indefinitely streaming data.

In some embodiments, each cloud computing service in a disclosed pipeline may potentially have a custom component before the each service to ensure that input data is compatible. For example, normalization component 32 may perform processing on the input data to make it compatible to the processing of the current stage.

In some embodiments, normalization component 32 is configured to standardize data. Some embodiments of normalization component 32 may, e.g., identify whether a portion of input audio data is of a proper size (e.g., above a threshold, below a threshold, within a pair of thresholds, etc.). For example, cloud-computing vendor 80-1 may require file sizes of range A (e.g., 50 KB to 5 MB), whereas cloud-computing vendor 80-2 may require file sizes of range B (e.g., 500 KB to 800 MB). In another example, vendor 80-1 may require a .WAV file format, whereas vendor 80-2 may require an .MP3 file format. As such, some embodiments ensure that cloud computing requirements for particular services are met, even converting the data to meet the requirements, in these or other embodiments.

Some embodiments of normalization component 32 may identify one or more of a plurality of special characters from among input textual data. For example, the special character may be a punctuation or other delimiter of a thought or of an expression. For example, some embodiments of normalization component 32 may first identify portions of data (e.g., by thought/sentence boundary) and concatenate the portions until a maximum size limit is approached. If another portion, when concatenated, causes the concatenated data to exceed the size limit then that could cause the other portion to not be concatenated and cause a triggering of the feeding of the concatenated data to the particular cloud service. The concatenation may be with respect to audio data portions (i.e., pre audio-to-text processing) or textual data portions. This downstream processing may thus be performed before or after (or independent of) a translation processing stage.

In some embodiments, normalization component 32 is implemented by or in relation to a web crawler.

In one exemplary embodiment, after normalization component 32 identities one or more of the special characters, dissemination component 38 may automatically notify a user that one or more special characters have been encountered. As a result of this or another notification, the user may make a particular decision useful for furthering a purpose that had served as impetus for configuring the current series of cloud-computing services. Similarly, in another example, a user may be notified when a particular translation is complete and then a user may validate the translation. The result of this validation may be fed back into the processing operation such that that operation learns and improves.

In one implementation, service configuration component 34 may configure a series of stages (e.g., a pipeline) using selections made by a user via the UI or by a user via a script. This series of stages may be considered a pipeline, when the data source comprises more than a single portion of data, thereby implying that at least some of the stages need to repeat or iterate. Once configured, the series of stages may help identify data such that a particular technological problem can be solved. For example, the series of stages may notify a user whenever a user speaks or types text comprising positive views of terrorism (or uploads video with violent weapons depicted in a menacing manner). At this point in such examples, the series of stages may terminate, and the user may determine subsequent information (e.g., a physical location and/or background history of this user). Alternatively, the series of stages may be further configured by component 34 to solve this problem by automatically identifying said subsequent information (location and/or biography). As such, every technological problem may be addressed by another configurable processing stage of the series of stages (and preferably via a cloud-computing service thus providing flexible resources and ease of use, e.g., by not requiring the user to purchase the hardware, purchase the software, perform maintenance on this hardware and software, etc.).

Some embodiments of configuration component 34 may implement a batch-executed set of processing operations. For example, after initially configured, a set of computing devices may be selected for execution of a set of processing operations. In this example, a first four operations of a series of six operations may be caused to execute by service execution component 36. And, subsequently, the last two operations of the six may be caused to execute by service execution component 36 calling for service execution via servers 90 in liaison with cloud computing vendor 80. Alternatively, at every interval or on-demand, all six processing operations may be called to execute at once (in the configured order).

Some embodiments may support user-selection of one or a custom combination of a plurality of different services, including custom and cloud computing services. In one example, a user may translate and then perform a text-to-audio service. In another example, a user may perform a custom search with or without subsequent NLP. Some embodiments may flexibly have each processing operation be optional, but other embodiments may have at least one necessary operation. In some embodiments, data analytics, which may be a cloud-computing service as well, may be performed in a configured series of operations. In other embodiments, other big data processing may be performed in the series.

Some embodiments of service configuration component 34 and/or service execution component 36 may support the running of a processing operation by supplying properly formatted, standardized, encoded, and/or translated task parameters to cloud computing data processors 90, including one or more VMs and/or one or more virtual network functions (VNFs). Examples of VMs used by cloud vendors 80 may include gateways, firewalls, routers, real-time analytics, customer edges, provider edges, proxies, rendezvous points, and the like. Other VMs may provide network resources to system 10 users, such as virtual central processing units (vCPUs), memory, or a network interface cards (NIC).

Some embodiments of configuration component 34 may select a processing service that performs analytics on a reduced set of resulting hits of a search (e.g., to determine a type or subject of a negative or positive comment, the negative or positive comment being identified as such from a previous NLP stage). A decision pertinent to any application may be performed from a result of the analytics. For example, a politician may adjust his or her campaign towards a preponderance of negative or positive comments about a particular subject. In some implementations, the data output from one processing stage (e.g., translation 110, NLP 114, etc.) may then be further processed. For example, operation 122 exemplarily depicted in FIG. 6 may be called to implement a text-to-audio cloud-computing service such that a person hears at least a portion of the input data.

Some embodiments of service configuration component 34 may facilitate the reordering of processing stages. For example, this component may cause a processing stage dragged by a user via a UI, as is demonstrable with respect to FIGS. 3A and/or 4-6, and dropped to interconnect with one or more other processing stages at a different stage in a pipeline. The reordering of the processing stages may be due to a change in user requirement and/or system demand. For example, a user may adjust a position of the translation processing operation, which is listed second among the three processing stages depicted in the bottom-left corner of FIG. 3A, down to below the NLP processing operation, i.e., so that the output data from the NLP stage serves as input to the translation stage.

Some embodiments may improve upon known approaches by being able to have one configurable series of processing operations, e.g., that can support data in any language. For example, a user may make a selection via the UI such that component 34 configures for use translation service 110 in pipeline 150, thus avoiding having ten different translators (e.g., human translators). As such, this pipeline may obtain data from online sources conveying data in ten different languages. For example, a user may avoid doing a search in Spanish and a search in Arabic (i.e., performing instead one search in English after translating each of the Spanish and Arabic data to English). Pipeline 150 may thus simplify overall processing via the translation and searching being performed together.

Different cloud vendors 80 may provide variations of certain types of services. For example, vendor 80-1 may support a translation service for thirty languages, whereas vendor 80-2 may support a translation service for over one-hundred languages. Depending on the configuration parameter detected to be selected by the user via the UI, configuration component 34 may automatically select a vendor that can perform the requested translation service (e.g., that can support the desired input and/or output language). In some implementations, different cloud vendors 80 may each perform data conversion differently, e.g., supporting different input and output data formats. For example, service 106 of one vendor 80 that is selected via the UI may only support .WAV audio input format, and the user may select for the output text either the .DOCX or .PDF format.

Some embodiments of service configuration component 34 may facilitate selection of cloud computing vendor 80 based on criteria describing the quality of service (QoS) provided by that vendor's resources. For example, a user of system 10 may have predetermined knowledge that vendor 80-1's translation service is superior to vendor 80-2's counterpart service. In this example, vendor 80-1's NLP, though, may be known to be inferior to vendor 80-2's counterpart service. Accordingly, in this example, service configuration component 34 may configure translation operation 110 of vendor 80-1 and NLP operation 114 of vendor 80-2 for executing their services in a same pipeline.

Users are known to both improperly configure and inefficiently configure cloud computing devices, causing, e.g., an unnecessarily expensive over-design. Some embodiments of configuration component 34 thus improve upon known approaches by always properly configuring the service, leading to a more reliable and cost-effective solution (i.e., due to paying less for less resources actually consumed). For example, some embodiments of component 34 may employ use of templates for configuring the cloud infrastructure and other components of system 10.

In some embodiments, a different service may be performed for answering each different question demanded from the data. For example, a deaf person that knows English may want to inquire what people in a particular Asian language are saying about a certain product. This user may thus demand, at a minimum, a speech to text service, a translation service, and a search service in a logical order, each of these services being performed by a different set of cloud computing devices. For example, the user may configure vendors 80, via a UI supported by configuration component 34, to first convert the speech to text, next perform the translation, and then perform the search. In another example, if the search service is best performed in the Asian language, then the user may adjust, via the UI, the ordering by having the search operation instead performed before the translation operation.

Service execution component 36 may initiate each processing stage and feed it data, starting with data from database 60 for a first operation in the series of stages. Then, this component may direct output data of a previous stage to be input data for subsequent processing stage(s).

Service execution component 36 may employ command-line tools and/or software development kits (SDKs) to cause the cloud computing services to be performed on a set of servers 90. Some embodiments of service execution component 36 may, e.g., after all configuration selections are made, automatically cause for the user deployment of a set of VMs (e.g., one or more virtual servers) such that the processes in the series begin executing. Each of these deployed VMs may potentially be of a different type, e.g., with a varying capacity and size tailored to a specific workload type and application (e.g., including for memory-intensive and/or time-sensitive computing jobs). Some embodiments of component 36 may automatically make a selection such that a vendor's set of cloud computing devices automatically scales capacity in a manner that favors and/or ignores health and/or performance of the underlying hardware (and/or software).

Some embodiments of execution component 36 may utilize a custom application programming interface (API) to access data and/or functionality from each different back-end service provided by cloud computing vendors 80. For example, the API for causing performance of NLP processing stage 114 may be different from the API for performing translation service 110. That is, execution component 36 may be configured to use the API appropriate to the cloud computing service intended for use. For example, component 36 may perform a custom keyword search that outputs data with parameters fitting for vendor 80-1's NLP but not necessarily for vendor 80-2's NLP.

When a translation service provided by vendor 80 is selected and configured via configuration component 34, execution component 36 may, in some implementations, cause the translation service to be performed in near real-time. In implementations where cloud translation service 110 is executed, service execution component 36 may obtain the translated data (i.e., output from this stage) and feed this data as input for another cloud processing stage. For example, the untranslated data may be lyrics from music, text from websites, etc., and the further processing may be a keyword search on the translated data.

Figure 5:
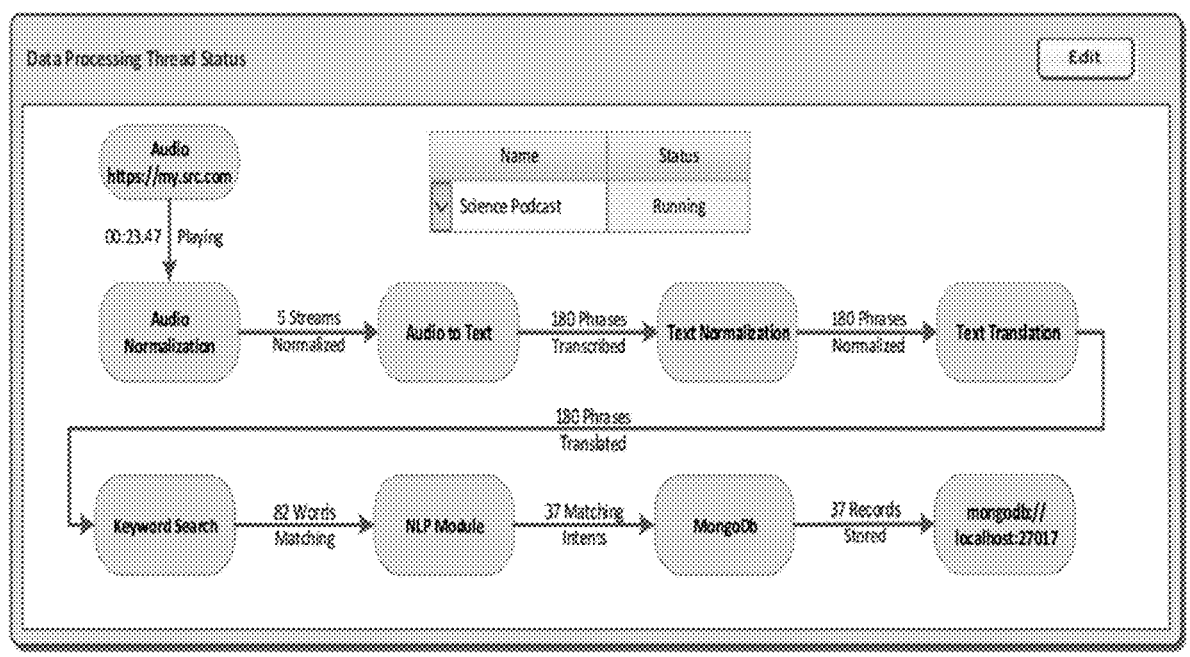
FIG. 5 illustrates an exemplary UI window for obtaining status of executing processes, in accordance with one or more embodiments.
Figure 6:
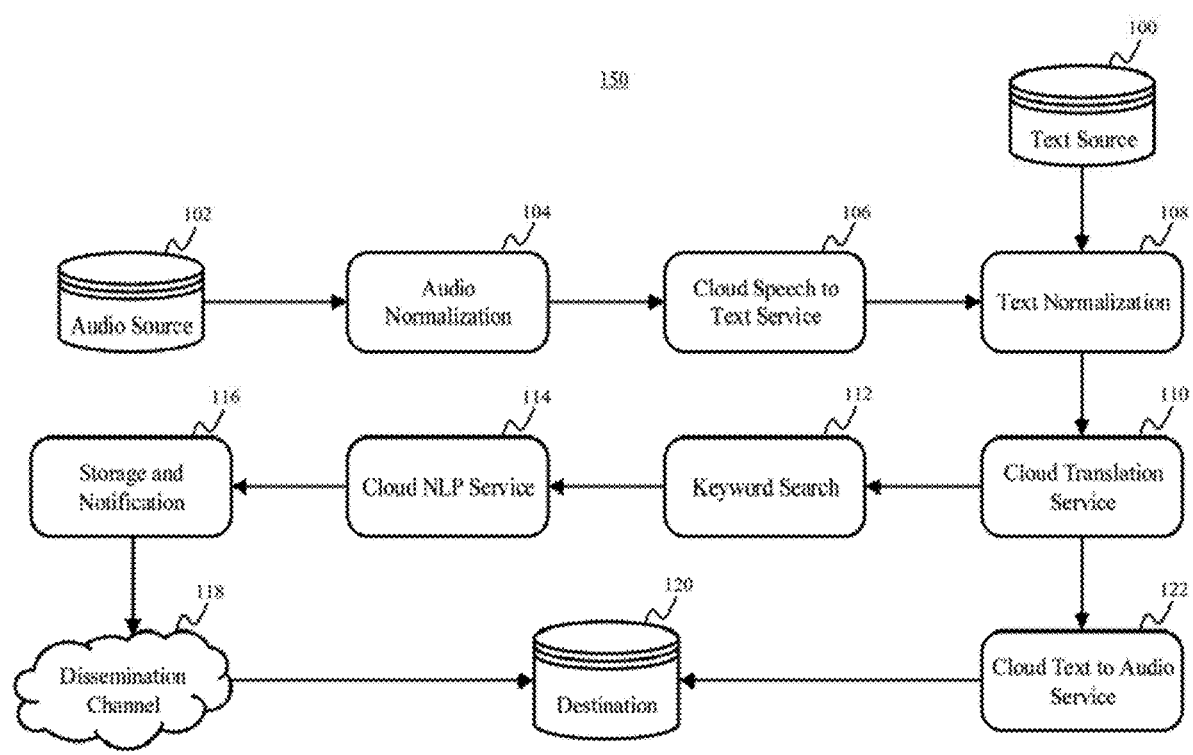
FIG. 6 illustrates a flowchart of an exemplary series of processing stages that operate on source data and that store a final result, in accordance with one or more embodiments.

In some implementations, a user may select a configuration such that execution component 36 performs itself or directs vendor 80 to perform a search (e.g., the search stage of FIGS. 5-6). In some embodiments, searching operation 112 may be implemented via known approaches, including use of database 60 indexing and term-frequency inverse-document-frequency (TF-IDF) statistics. Output data from this search may comprise results, including, e.g., information about one or more people (e.g., the aforementioned politician that may be conducting a poll), places, things (e.g., the one or more aforementioned products being reviewed), or concepts. Then, the results may be led into cloud-computing devices performing NLP using a set of criteria, e.g., to indicate whether there are search results that provide favorable information about a particular person (e.g., the politician) or product. For example, by performing a series of processing stages, system 10 may determine, via an NLP stage of obtained reviews, a favorability rating for the people or products. The search results may, e.g., identify many hits that appear relevant but actually are not, which are herein termed false positives. And, in this example, the false positives may initially be identified as relevant by the search processing but then later discarded as irrelevant at the NLP stage. One or more processing stages that follow a search processing stage may perform computations to evaluate results using another set of criteria. For example, these latter processing stages may quantify how many people who characterized a political candidate positively are planning to vote for said candidate, belong a particular demographic, or conveyed the positive characterization with respect to a particular subject.

The demographic of an individual may be any descriptive characteristic, such as a place of residence, birth, age, gender, country of citizenship, education level, etc. This demographic may be selected from the UI supported by UI device 18 as one of among many different types of configurable parameters for narrowing results of a search processing operation via any suitable processing operation (including the search operation itself).

In some embodiments, after identifying text that contains one or more keywords, execution component 36 may perform itself or may direct vendor 80 to call another cloud processing operation to narrow the results by identifying a relatively small amount of hits from among a much larger results set. This subsequent processing thus reduces a number of false positives (i.e., each search result that is not relevant to the user's intent behind the query) and determines whether each of the results satisfies one or more criteria (e.g., is the text in which the keyword is found positive or negative overall about a particular subject, this determination being potentially performed via an NLP stage). This processing makes the results set workable, e.g., by reducing a number of hits from thousands or millions to dozens or hundreds (but any scale of reduction is contemplated by the present disclosure). At this time, a user may be notified or another service may be triggered based on a determination made with respect to a hit in the results set. In embodiments where the user is notified upon completion of a particular processing stage, the notification may be via the UI (e.g., a textual report on a display) or via a text message, an email, a voice-message, a social media post, or another suitable form of communication by dissemination component 38.

In some embodiments, the disclosed, selectable searching operation may be performed by service execution component 36 or by cloud computing vendor 80. That is, searching may be a custom component or it may be treated as any other selectable cloud computing service. For example, some embodiments of component 36 may perform a search by a user in a given location (e.g., by a politician in Washington, D.C. USA), the search being in this example for data about people in another location (e.g., the politician's district). Sources of this data may be, e.g., surveys scraped via online servers or databases procured via known channels (e.g., radio, cellular, TV, coaxial cable, Wi-Fi, fiber optic, etc.). Some exemplary sources of data to-be-processed include opinion and review sites, news sites, blogs, and social media, but any known source of textual, audio, and/or visual data may be used. Normalization of such input data may comprise converting it into a common format. For example, normalization component 32 of disclosed embodiments may create portions of data compatible with downstream cloud system processing by identifying predetermined features or by identifying a learned feature using a growing list (e.g., as determined via machine-learning) by observation of patterns over large, trained datasets, such as a pause that indicates an end of a sentence or thought; any data that is encountered after that identified feature may form part of subsequent portion(s). After initial downstream processing, intermediate data may comprise text.

In some embodiments, cloud computing vendor 80 may have available for leasing one or more artificial intelligence (AI) services. In embodiments where an AI cloud computing service is configured for use, execution component 36 may cause a trained prediction model (e.g., which is based on one or more neural networks) to learn characteristics of the input data and make a prediction about its content. An exemplary use of machine learning may be that certain words that have a same spelling have different meanings based on context, as previously observed in the training data, in another example, the MapReduce framework may be implemented in a processing stage to filter and sort input data and then to identify characteristics about that data (e.g., identifying by whom and when positive comments are spoken about the politician and counting a number of such positive instances about a particular subject). Differences in ways that people communicate and/or relate ideas with each other may be based on differences in regions, cultures, nations of residence, and/or other demographic details associated with those people. Accordingly, data specific to such details may be used, in some embodiments, as hyperparameters to train NLP AI models. For example, training data may include different slangs, pronunciations, spellings, and/or other characteristics.

Some embodiments of service execution component 36 may save energy and/or processing costs (i.e., because execution of each stage may include paying for use of cloud computing resources, such as processing and data transmission) compared to any known way of executing cloud-computing processing stages. For example, service execution component 36 may cause processing stage 110 of FIG. 6 to execute once textual data obtained from text source 100 (which could be implemented as or obtained from textual database 60-2) is normalized at operation 108. As a result of this processing, service execution component 36 may cause stage 112 to run. That is, component 36 may determine whether a processing operation of a stage should be executed based on the output data of a previous stage satisfying one or more criteria. For example, if the translated data indicates that the obtained textual data is irrelevant to the user, then keyword search 112 may not be caused to run. In another example, component 36 may cause stage 112 to run to identify a webpage having one or more searched keywords. The NLP stage 114 may then determine whether the identified webpage has sales data that is ramping up or down (e.g., by an amount that breaches a threshold). Component 36 may then run storage and notification stage 116 (or another cloud-computing service not shown in exemplary FIG. 6) only if data output from NLP stage 114 indicates that the sales data changed at a particular rate. Since each processing stage consumes resources (e.g., transitory memory, non-transitory memory, CPU processing cycles, etc.), by avoiding executing one or more stages component 36 may cause system 10 to operate in an improved fashion technologically. Accordingly, some embodiments of component 36 may cause efficiency gains by stream-lined, minimally-tailored processing. To be clear, any processing stage(s) may be automatically analyzed for conditionally determining execution of subsequent stage(s).

Some embodiments of component 36 may create a relationship from the data, e.g., between two different facts generated as a result of one or more NLP stages. For example, a first NLP stage 36 may identify that a first person posted instructions for making a bomb. Another NLP stage 36 may identify that another person immediately afterwards purchased materials for building a bomb. A third NLP stage 36 may then determine a relationship between these two people, e.g., that they form a terrorist network. By configuring stat NLP stage via service configuration component 34, a user of services pipeline 150 may determine correlations and associations between terminology and euphemisms (e.g., references to candy refer to a particular drug).

Some embodiments may facilitate validation of a service performed by a set of cloud computing devices. For example, after translation operation 110, execution component 36 may store in database 120 both the original audio (e.g., from audio source 102) and the translated audio such that a subsequent processing, e.g., by a human or another set of cloud computing devices, may validate the translation.

In some embodiments, dissemination component 38 may send a notification indicating a result of the series of processing operations. In some embodiments, dissemination component 38 may report the status and/or analytics of each processing operation to a user. Returning to one of the previous examples, the user may manually or another processing stage of pipeline 150 may automatically determine an approval rating for the politician based on data analytics output from a configured processing operation.

Figure 2:
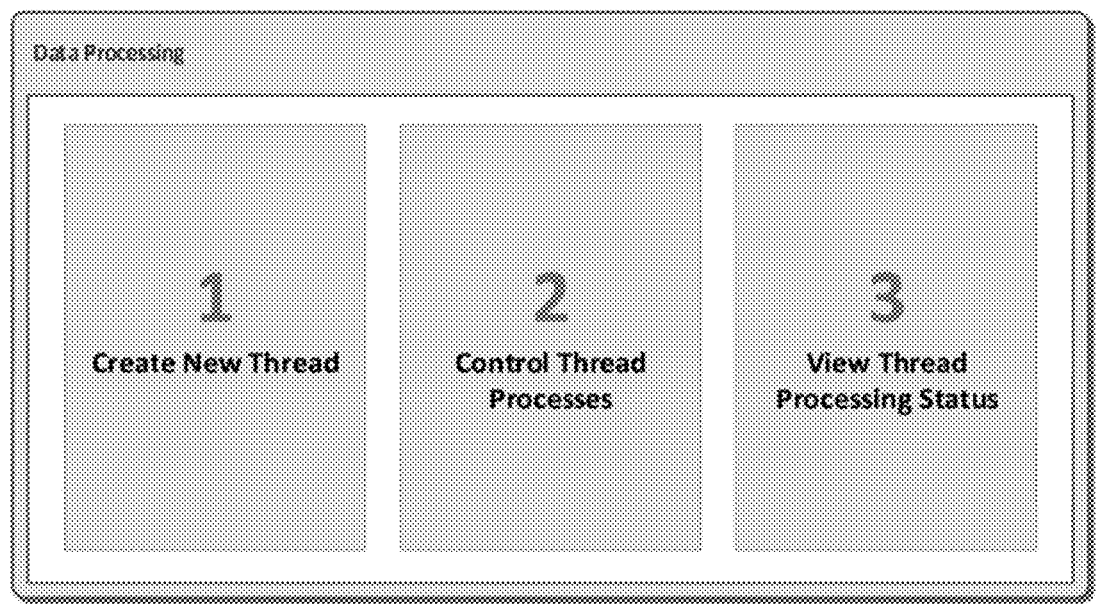
FIG. 2 illustrates an exemplary, initial landing-window of a user interface (UI) for selecting a mode of operation, in accordance with one or more embodiments.

FIG. 2 illustrates an initial webpage or application window that may be presented via a UI to the user once an application is opened that comprises some disclosed embodiments. From this UI, the user may first select a button similar to the one presented on the left to create or load a new thread. Once the thread (e.g., a series or pipeline of processing operations) is configured, the user could then control a running of the thread in a second step by selecting the middle button. After the thread is ongoing, after the thread completes at least one processing operation, and/or after the thread completes execution of all processing operations, the user could select the button on the right to view a status of the processing.

FIG. 3A depicts user configuration of a series of processing operations. Since most processing operations would pertain to a general theme or purpose, an appropriate name for the processing as a whole may be chosen and input via the UI depicted in this figure. Other elements of this UI are a field for specifying an input data source (e.g., identified via a URL, path to a filename on a drive, or another link to source data), a type of the input data (e.g., audio, text, visual data, and/or another suitable type of static and/or streaming data), the processing operations themselves, a timeframe for executing the processing operations, and a destination for results of the processing. By clicking, e.g., on the + button a user may be able to add a new processing operation to the series. Inversely, by clicking, e.g., on the X button the user may be able to remove an existing processing operation.

The UI depicted in FIG. 3A may be supported by user interface device 18 of FIG. 1, and it may include widgets to create, modify, and remove processing operations. Fields may be automatically populated with default values (e.g., which is based on a selected theme of the stages' configuration) and or users may be prompted to input appropriate values.

FIG. 3A depicts user configuration of each of a series of processing stages, which may be performed, e.g., via drop-down menus. For example, a user may select any known processing operations. Some configurable cloud services may relate to security processing (e.g., identity management, cryptography, and other known security applications), analytics (e.g., based on a Hadoop framework using MapReduce), NLP, text conversion (e.g., speech-to-text, text-to-speech, etc.), text translation, searching, image (e.g., facial or any other visual pattern) recognition, AI (e.g., machine learning, deep learning, or another automated mimicking of cognitive function), storage, and/or notification (e.g., messaging an/or for file sharing). But this list of services is not intended to be exhaustive, the present disclosure thus contemplating user configuration of any known, available processing operation.

Service configuration component 34 may intemperate with user interface device 18 to have a series of expanding or diminishing drop-down menus for each processing stage. For example, a first list of available operations when receiving, audio data may be minimal (e.g., audio-to-text and one other cloud computing service); and then in a next stage (once textual data is generated) more available operations may be listed for user-selection (e.g., NLP, search, translation, and other services). In this or another example, the list of available operations decreases in number; that is, after a translation the user may then not have translation service being offered to him or her, which is at least one less available operation. In this fashion, service configuration component 34 may tailor the list based on what is reasonable for subsequent processing or on what is technologically possible. For example, a user may have twenty cloud-computing processing options available upon obtaining textual data, but after performing a search and after performing one or more NLP services, there may be no more available NLP services that a user can run; accordingly, in this example, the user may be provided a list of operations much smaller than twenty.

FIG. 3B depicts one implementation for selecting vendors 80 for a particular processing operation and one implementation for configuring parameters for that processing operation. Such parameters may be classified as common parameters and proprietary parameters. Common parameters are those used by more than one cloud services to receive and handle requests for services. Proprietary parameters are those which are service-specific, comprising, e.g., particular information required for vendor 80-1 to receive a service request that is not required by vendor 80-2 to receive the service request. Proprietary parameters may not be used outside of a particular cloud implementation. Some embodiments of configuration component 34 may encode, format, derive, transform, etc., these parameters to satisfy the executable requirements of any cloud vendor's service. For example, vendor 80-2 may require particular information and/or particularly formatted information that are different from those of vendor 80-3. Configuration component 34 thus ensures that information sent to each vendor accords with their requirements. In some embodiments, configuration component 34 receives or builds (e.g., collects information and/or encodes) JSON files containing data describing how resources (including VMs) are created and/or how selected processing operations are assigned to servers 90. These JSON files may be task entries and/or other cloud solution information. User customizations may also be supported by components of processors 20.

As depicted in FIG. 3B, a user may select, via the UI, a parameter for one of the processing stages. For example, when the processing stage is a translator, the user may select input and/or output languages. For NLP, as shown in this figure, a user may select whether the NLP is to identify one or more of a meaning, intent, and sentiment. Further, a user may select a particular vendor to perform the service (e.g., Google, Microsoft, Amazon, etc.). Service configuration component 34 may then automatically configure (i.e., without need of any further user input) the selected parameters via an API offered by the selected cloud computing vendor. In some embodiments, service configuration component 34 may generate a list of processing operations. Upon selection of one such operation by the user, this component may automatically select a most-fitting cloud-computing vendor for a current state of the data (i.e., based on a previous process selected in the series of stages that is known to generate data of a format compatible with a particular vendor). In other embodiments, the user may be given the option to select the cloud computing vendor to perform the selected service. In either of these embodiments, component 34 may facilitate configuration of a series of processing stages independent of the underlying provider of the cloud computing service.

The exemplary UI window of FIG. 3B may be a pop-up window. Although checkboxes are shown in FIG. 3B, this is not intended to be limiting as drop-down menus or any other known element may be used. In the example of FIG. 3B, a user (e.g., the aide of the politician) may first select vendor 80 for performing a service; in this depiction, Google is the selected vendor and NLP is the previously selected service. The user may then select in this window one or more parameters for performing the service on the data that is output from a previous processing stage (e.g., search 112 of FIG. 6). The selectable parameters may be, e.g., a desired sentiment, intent, meaning, etc. The available parameters may depend on the type of processing for that stage and on vendor 80 that offers that type of processing. For example, NLP 114 offered by vendor 80-1 may offer such parameters as classification, tokenization, stemming, lemmatization, tagging, parsing, and semantic reasoning of the first text. In an example, after a user of system 10 selects from a drop-down list of available processing operations in FIG. 3A, the user may then be prompted with a window similar to that depicted in FIG. 3B so that the user selects one or more NLP parameters. Some embodiments of configuration component 34 may thus guide the user in a step-by-step fashion. In an example, once the processing operations are all fully configured and as a result of NLP stage 114, a user may be notified at stage 116, when it is determined that a person used the word "gun" in a context that is potentially terrorism, and the user may not be, notified at stage 116, when it is determined that the person used that word in a context that is likely fitting a law-abiding member of the NRA.

Figure 4:
FIG. 4 illustrates an exemplary UI window for monitoring and controlling processing threads, in accordance with one or more embodiments.

FIG. 4 depicts a UI for controlling execution of one or more series of processing operations. For example, a first ongoing pipeline may be processing data from a science podcast. In parallel, a second ongoing pipeline may be processing data from a technology blog. As shown in FIG. 4, a user at any time before final completion may pause or stop the processing operations. Also depicted in this figure is a thread for processing data from a biology journal, but this thread is shown paused; at any time, the user may select the play button to continue processing of the data from this journal.

FIG. 5 depicts the status of one exemplary implementation of an exemplary data processing flow. In this example, input audio (e.g., having 23 minutes and 47 seconds of play time) may be sourced from the URL http://my.src.com, as shown in the top-left corner, and then the obtained data may be configured for an audio normalization operation. In some implementations, multiple streams of audio data may be normalized, each comprising portions of data. The normalized portions of audio data are then depicted in FIG. 5 to be converted to text. This transcribed text may then be further normalized, e.g., to identify logical boundaries of segments. The normalized textual segments may then be translated and searched, e.g., to identify any terms that match user-provided keywords. From the search results, the depicted NLP module may then perform further processing to narrow the results, e.g., to 37 results that match a configured intent. Then, these narrowed search results may be stored for future use.

In the example of FIG. 5, the input audio stream(s) may be podcasts of technology experts discussing the latest products. And, as a result of this pipeline, the 37 stored records may be analyzed further. For example, the user may become aware that there are dozens of complaints about a button on a mobile phone being in a suboptimal location versus just two complaints about a screen size. The user may thus be triggered to respond to the dozens of complaints. In some implementations, the NLP module depicted in FIG. 5 may be configured by component 34 to add parametrized weights to data sources that are from particular people (e.g., the President of the United States of America). As a result, the user may be triggered to first respond to the two complaints instead of the dozens of complaints because of the weights. Other weights could be assigned, e.g., to product reviews that mention issues that would require costly repairs.

In some embodiments, the UI depicted in FIG. 5 may comprise an edit feature (e.g., via the drop down arrow next to the descriptor for the data source or via a separate button). The series of stages may be edited for reordering processing stages, changing parameters of one or more processing stages, adding another source (e.g., live, near-live, or on-demand stream) of data, and/or returning to the UI depicted exemplarily in FIG. 3A.

FIG. 6 depicts an exemplary set of processing stages 150 that are assembled into a complete system of different processing services, such as speech-to-text, text-to-speech, language translation, NLP, etc. The completed system, once configured as such, may be executed to characterize and/or classify input data. The cloud services may be managed (e.g., load-balancing) by vendors 80, but some parameters may be accessed and/or controlled by the user of system 10 via service configuration component 34.

In some embodiments, the services of FIG. 6 may be a hybrid pipeline, i.e., a mix of custom processing modules and cloud service components. In this example, data is introduced into the pipeline as either audio 102 and/or text 100. Regardless of the type of source data, the first step may be to get the data from the desired source and normalize it (e.g., audio normalization 104 and/or textual normalization 108) to be compliant with a cloud service's requirements. Requirements could vary based on the cloud service provider and may include certain restrictions, such as size, duration, languages supported, etc. The main difference between the two different data sources is the additional speech to text process 106 in order to streamline the processing of audio data. In some embodiments, the output data of operation 106 is formatted the same as if the data were from data source 100. If the incoming stream is in a different language from the desired one, then the data may be passed through the translation cloud service 110. Even though a translation stage might not be a requirement, it could be a way to simplify further processing, such as searching 112, archiving 116, or classifying data context. Search stage 112 may be a custom module implemented by execution component 36 to scan the data for specific keywords of interest. The data can then be processed through one or more NLP modules 114 available from any cloud service provider for refining the search results. For example, NLP stage 114 may help find themes, relationships, meanings in the text using both supervised and unsupervised learning methods. Results from the pipeline may be disseminated 118 to an interested party and/or stored in database 120 for later use. Since the disclosed approach is almost entirely user-configurable, one or more of the different stages of processing pipeline 150 may be omitted, moved, or replaced based on the incoming data and user requirements. Adding processing operations would in many instances add value to the resultant data generated by processing stream 150.

Some embodiments of pipeline 150 may be more focused on data storage. In some embodiments, dissemination channel 118 may be configured to perform cloud storage, e.g., for analytics, archiving, and other data backup. Any suitable form of transitory (e.g., RAM) and/or non-transitory (e.g., flash, magnetic disc, optic, ROM, PROM, etc.) memory is contemplated by the present disclosure. In some embodiments, data output form a particular processing stage may be saved in a set of memory devices, such as database 120 (e.g., for inspection of results, repository before further processing, or before being served to an end-user) of FIG. 6. Although storage 120 is depicted, as a final repository of processed data (i.e., output from service stage 122), any output data from any intermediate stage may use this storage. This storage may be implemented via a mongoDb, which is a cross-platform document-oriented database program, Amazon's simple storage service (S3) of its AWS, a structured query language (SQL) server, and/or the Pivotal Greenplum database management tool. But this is not intended to be limiting as any suitable data storage may be used and any database extraction method may be implemented.

In some embodiments, the cloud computing devices may be directed to execute operations in parallel (i.e., not necessarily in a pipeline). For example, at a single time, operations 102, 104, 106, and 108 may be operating while operations 100 and 108 are operating. In other embodiments, a combination of parallel processing may be, configured to perform with series (e.g., pipelined) processing. These options may be parameterized and offered to a user as individual selections via the UI.

Figure 7:
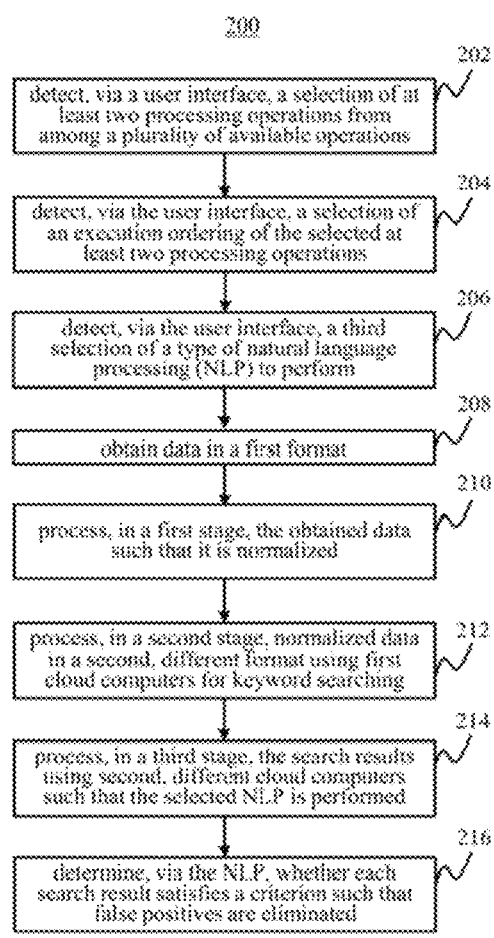
FIG. 7 illustrates a method for performing one exemplary sequence of processing operations, in accordance with one or more embodiments.

FIG. 7 illustrates method 200 for configuring a series of processing operations via a UI and for executing these operations to arrive at informative results that satisfy a user need, in accordance with one or more embodiments. Method 200 may be performed with a computer system comprising one or more computer processors and/or other components. The processors are configured by machine readable instructions to execute computer program components. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 7 and described below is not intended to be limiting. In some embodiments, method 200 may be implemented in one or more processing devices (e.g., a digital processor, an analog processor, a digital circuit designed to process, information, an analog circuit designed to process information, a state machine, and/or other mechanisms for electronically processing information). The processing devices may include one or more devices executing some or all of the operations of method 200 in response to instructions stored electronically on an electronic storage medium. The processing devices may include one or more devices configured through hardware, firmware, and/or software to be specifically designed for execution of one or more of the operations of method 200.

At operation 202 of method 200, a selection of at least two, processing operations from among a plurality of available operations may be detected via a user interface. As an example, a user may select for performance normalization, searching, and NLP operations. In some implementations, processor 20 may know to automatically add a normalization processing stage without requiring the user to do so. In another example, custom processing operations may be added to a series through a particular API tool. These custom operations may be used, for instance, to make decisions about the type of processing to perform next. These custom operations may include custom data processing to eliminate false positives (hits) and/or to augment the data with additional information that is to be considered during subsequent operations. In some embodiments, operation 202 is performed by a processor component the same as or similar to configuration component 34 (shown in FIG. 1 and described herein).

At operation 204 of method 200, a selection of an execution ordering of the selected at least two processing operations may be detected via the user interface. As an example, a user may configure an NLP stage to occur after a keyword search operation. In some embodiments, operation 204 is performed by a processor component the same as or similar to configuration component 34 (shown in FIG. 1 and described herein).

At operation 206 of method 200, a third selection of a particular type of NLP to perform may be detected via the user interface. As an example, a user may configure the NLP service to identify data that carries a particular sentiment, to determine data that answers a particular question, or to generate data that summarizes the input data. But any suitable NLP type and any suitable parameter for that type may be offered for selection to the user. In some embodiments, operation 206 is performed by a processor component the same as or similar to configuration component 34 (shown in FIG. 1 and described herein).

At operation 208 of method 200, data in a first format may be obtained. As an example, a stream of textual data may be obtained from a website. In some embodiments, operation 208 is performed by a processor component the same as or similar to information component 30 (shown in FIG. 1 and described herein).

At operation 210 of method 200, the obtained data may be processed in a first stage such that this data is normalized. As an example, certain punctuation may be identified from among the textual stream for segmenting the data into standard-sized portions. In some embodiments, operation 210 is performed by a processor component the same as or similar to normalization component 32 (shown in FIG. 1 and described herein).

At operation 212 of method 200, normalized data, which may be in a second, different format, may be processed in a second stage using first cloud computers to perform keyword searching. In some embodiments, operation 212 is performed using a processor component the same as or similar to execution component 36 (shown in FIG. and described herein).

At operation 214 of method 200, the search results may be processed in a third stage using second, different cloud computers such that the selected NLP is performed. In some embodiments, operation 214 is performed using a processor component the same as or similar to execution component 36 (shown in FIG. 1 and described herein).

At operation 216 of method 200, whether each of the search results satisfies a criterion may be determined via the NLP such that false positives are eliminated. As an example, a decision may be made based on the more manageable, smaller list of results. In some embodiments, operation 216 is performed using a processor component the same as or similar to execution component 36 and/or dissemination component 38 (shown in FIG. 1 and described herein).

Figure 8:
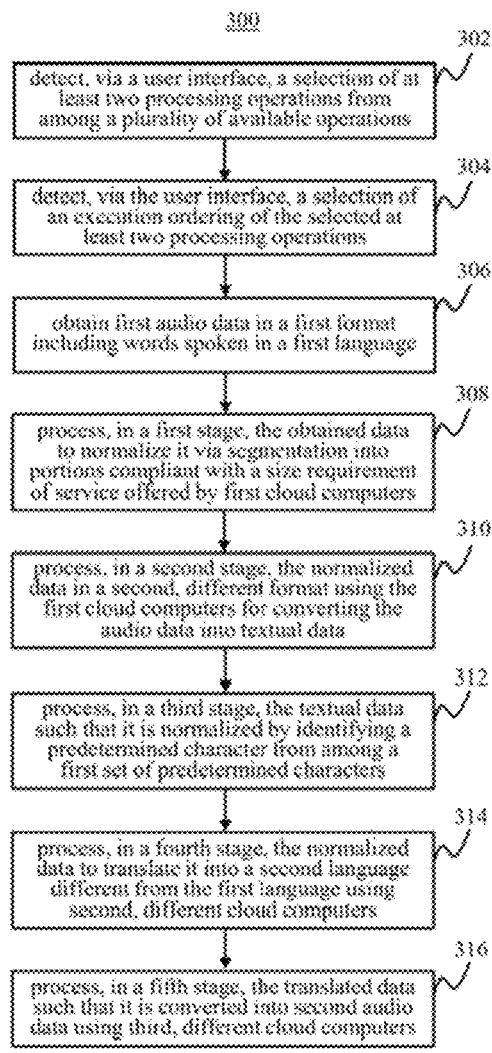
FIG. 8 illustrates a method for performing one exemplary sequence of processing operations, in accordance with one or more embodiments.

FIG. 8 illustrates method 300 for configuring another series of processing operations via the UI and for executing these other operations to arrive at different results that satisfy a different need of a user, in accordance with one or more embodiments. Method 300 may be performed with a computer system comprising one or more computer processors and/or other components. The processors are configured by machine readable instructions to execute computer program components. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 8 and described below is not intended to be limiting. In some embodiments, method 300 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 300 in response to instructions stored electronically on an electronic storage medium. The processing devices may include one or more devices configured through hardware, firmware, and/or software to be specifically designed for execution of one or more of the operations of method 300.

At operation 302 of method 300, a selection of at least two processing operations from among a plurality of available operations may be detected via a user interface. As an example, a cloud-computing conversion operation and a translation operation may be selected. In some embodiments, operation 302 is performed by a processor component the same as or similar to configuration component 34 (shown in FIG. 1 and described herein).

At operation 304 of method 300, a selection of an execution ordering of the selected at least two processing operations may be detected via the user interface. As an example, translation operation may be configured to occur after the conversion operation. In some embodiments, operation 304 is performed by a processor component the same as or similar to configuration component 34 (shown in FIG. 1 and described herein).

At operation 306 of method 300, first audio data may be obtained in a first format, the audio data including words spoken a first languages. As an example a live broadcast stream of speech from an on-air talent may be received. In some embodiments, operation 306 is performed by a processor component the same as or similar to information component 30 (shown in FIG. 1 and described herein).

At operation 308 of method 300, the obtained data may be processed in a first stage such that it is normalized via segmentation into portions compliant with a size requirement of software provided by first cloud computers. As an example, the obtained audio data may be segmented into chunks having a play duration of a few seconds each. In some embodiments, operation 308 is performed by a processor component the same as or similar to normalization component 32 (shown in FIG. 1 and described herein).

At operation 310 of method 300, the normalized data, which may be in a second, different format, may be processed in a second stage using the first cloud computers for converting the audio data into textual data. As an example, a speech in the Mandarin language may be converted to a block of text in Chinese characters. In some embodiments, operation 310 is performed using a processor component the same as or similar to execution component 36 (shown in FIG. 1 and described herein).

At operation 312 of method 300, the textual data may be processed in a third stage such that it is normalized by identifying a predetermined character from among a first set of predetermined characters (e.g., periods, commas, semicolons, a certain phrase, etc.). In some embodiments, operation 312 is performed by a processor component the same as or similar to normalization component 32 (shown in FIG. 1 and described herein).

At operation 314 of method 300, the normalized data may be processed in a fourth stage such that it is translated into a second language different from the first language using second, different cloud computers. As an example, vendor 80-1 may have been directed by execution component 36 to perform speech-to-text in operation 310, and vendor 80-2 may be directed by this same component to perform a translation from Chinese characters into English letters. In some embodiments, operation 314 is performed using a processor component the same as or similar to execution component 36 (shown in FIG. 1 and described herein).

At operation 316 of method 300, the translated data may be processed in a fifth stage such that it is converted into second audio data using third, different cloud computers. As an example, the original speech spoken in Mandarin may now be available for the user to listen in near real-time in the English language. The user may even, in some implementations, select a particular accent configuration for generating the output, translated speech. This generated audio data may then be output, e.g., via a speaker, to a user. In some embodiments, operation 316 is performed using a processor component the same as or similar to execution component 36 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention art specifically illustrated and/or described herein. However, it will be appreciated that modifications and variations are contemplated and within the purview of the appended claims.

What is claimed is:

1. A computer-implemented process for configuring a plurality of processing stages, the computer-implemented process comprising:
   obtaining, from a first database, data in a first format;
   configuring the processing stages by:
      selecting a plurality of services from among a larger plurality of services, wherein at least one of the selected services is provided by a plurality of different cloud computing vendors, and wherein each of the processing stages comprises input data, a processing operation of the respective selected service, and output data;
      selecting one of the cloud computing vendors based on a format of the respective input data at the respective processing stage, wherein the respective processing stage is not executable by at least one other of the cloud computing vendors based on a required format of the respective input data; and identifying a normalization operation based on a compliance requirement of the selected service;

responsive to a user interacting at a user interface, executing (i) the normalization of the obtained data and (ii) the selected services using the output data of the normalization and via at least the one selected vendor; and notifying, via the user interface, a result based on the output data of a final stage of the configured processing stages, wherein the processing stages are configured to be reordered based upon any one or more of a requirement of the user or system demand.

2. The computer-implemented process of claim 1,
wherein a first of the selected services is executed before a second of the selected services, wherein a first list of available services, when selecting the first service, is different from a second list of available services, when selecting the second service, the difference being due to technological, processing possibility, and wherein the computer-implemented process further comprises detecting, via the user interface, a selection of an execution ordering of the stages.

3. The computer-implemented process of claim 2, wherein at least one of the stages comprises natural language processing (NLP) of the respective input data.

4. The computer-implemented process of claim 3, wherein the NLP is performed using an application programming interface (API).

5. The computer-implemented process of claim 2,
wherein at least one of the stages comprises a searching of a set of keywords to produce a set of results.

6. The computer-implemented process of claim 5, further comprising:

training a model to predict an intent behind use of one of the set of keywords based on a semantic meaning of one word.

7. The computer-implemented process of claim 1,
wherein the obtained data comprises first audio data including words spoken in a first language, and
wherein the selected service converts the first audio data into textual data.

8. The computer-implemented process of claim 1, wherein the selected service translates the normalized data into a different language.

9. The computer-implemented process of claim 1, wherein the result is outputted via a speaker.

10. The computer-implemented process of claim 1,
wherein the processing stages form a pipeline such that the output data of a stage forms the input data of a next stage in the pipeline, and
wherein a source of the obtained data facilitates streaming data.

11. The computer-implemented process of claim 1, further comprising:

determining whether to perform a processing stage of the plurality of processing stages based on the output data of a previous stage satisfying a criterion.

12. The computer-implemented process of claim 1,
wherein the obtained data comprises at least one of textual data and visual data in a first language, and
wherein the obtained data is conveyed by a first user that belongs to a first demographic.

13. The computer-implemented process of claim 1, further comprising:

storing, in a second database different from the first database, the result of the plurality of processing stages.

14. The computer-implemented process of claim 1, wherein the selected service is executed by configuring an automatically selected set of parameters via an API offered by the selected cloud computing vendor.

15. The computer-implemented process of claim 1, wherein each vendor has at least one virtual machine (VM) of a different type from VMs of the other vendors.

16. The computer-implemented process of claim 1, wherein the normalization operation includes applying a parametrized weight to a subset of the obtained data.

17. An apparatus, comprising:
one or more sensors;
a non-transitory memory including instructions stored thereon; and
one or more processors operably coupled to the non-transitory memory, the one or more processors being configured to execute the instructions of:
configuring processing stages by:
selecting a plurality of services from among a larger plurality of different services, wherein at least one of the selected services is provided by a plurality of different cloud computing vendors, and wherein each of the processing stages comprises input data, a processing operation of the respective selected service, and output data;
selecting one of the cloud computing vendors based on a format of the respective input data at the respective processing stage, wherein the respective processing stage is not executable, by at least one other of the cloud computing vendors, based on a required format of the respective input data; and
identifying a normalization operation based on a compliance requirement of the selected service;
responsive to a user interacting at a user interface, executing (i) the normalization of the input data and (ii) the selected services using the output data of the normalization and via at least the one selected vendor; and
notifying, via the user interface, a result based on the output data of a final stage of the configured processing stages,
wherein the processing stages are configured to be reordered based upon any one or more of a requirement of the user or system demand.

18. A non-transitory computer readable medium including instructions stored thereon that when executed by a processor effectuate:
obtaining, from a first database, data in a first format;
configuring a plurality of processing stages by:
selecting a plurality of services from among a larger plurality of services, where at least one of the selected services is provided by a plurality of different cloud computing vendors, and where each of the processing stages comprises input data, a processing operation of the respective selected service and output data;
selecting one of the cloud computing vendors based on a format of the respective input data at the respective processing stage, where the respective processing stage is not executable by at least one other of the cloud computing vendors based on a required format of the respective input data; and
identifying a normalization operation based on a compliance requirement of the selected service;

responsive to a user interacting at a user interface, executing (i) the normalization of the obtained data and (ii) the selected services using the output data of the normalization and via at least the one selected vendor; and notifying, via the user interface, a result based on the output data of a final stage of the configured processing stages, wherein the processing stages are configured to be reordered based upon any one or more of a requirement of the user or system demand.

19. The non-transitory computer readable medium of claim 18, wherein the normalization operation includes applying a parametrized weight to a subset of the obtained data.

* * * * *